(12) United States Patent
Limbacher

(10) Patent No.: US 12,394,543 B2
(45) Date of Patent: Aug. 19, 2025

(54) WALL BUSHING

(71) Applicant: AUDI AG, Ingolstadt (DE)

(72) Inventor: Reimund Limbacher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 204 days.

(21) Appl. No.: 18/354,459

(22) Filed: Jul. 18, 2023

(65) Prior Publication Data

US 2024/0029924 A1   Jan. 25, 2024

(30) Foreign Application Priority Data

Jul. 19, 2022   (DE) .......................... 102022117956.7

(51) Int. Cl.
*H01B 17/58* (2006.01)
*H02G 3/22* (2006.01)
*B60L 53/14* (2019.01)

(52) U.S. Cl.
CPC ............. *H01B 17/583* (2013.01); *H02G 3/22* (2013.01); *B60L 53/14* (2019.02)

(58) Field of Classification Search
CPC ............ H02G 3/08; H02G 3/081; H02G 3/10; H02G 3/12; H02G 3/121; H02G 3/123; H02G 3/22; H02G 3/26; H01R 13/46; H01R 13/501; H01R 13/53; H01R 13/533; H05K 5/00; H05K 5/02; H05K 5/0204; H05K 5/0217
USPC ....... 174/480, 481, 50, 53, 57, 58, 135, 151, 174/152 G, 153 G, 155, 2 R, 152 R, 650; 16/2.1, 2.2; 248/56, 49.1
See application file for complete search history.

(56) References Cited

U.S. PATENT DOCUMENTS 5,675,123 A * 10/1997 Proctor ................ H01R 13/506
174/58
6,689,954 B2 * 2/2004 Vaughan ............. E05B 73/0082
174/153 G (Continued)

FOREIGN PATENT DOCUMENTS

CN        112060948 A    12/2020
DE      202004011259 U1    9/2004

(Continued)

*Primary Examiner* — Angel R Estrada
(74) *Attorney, Agent, or Firm* — Seed Intellectual Property Law Group LLP

(57) ABSTRACT

A wall bushing is provided for leading an electrical cable through a wall. The wall bushing includes a hollow body which extends at least for a portion along an axis of extension, the hollow body having a cavity in its interior and having an opening at each of two ends opposite each other in the direction of the axis of extension, forming an access to the cavity, and at least one cover which in a closure position of the wall bushing closes one of the openings at least partially and in a pass-through position frees up this opening at least partly. The wall bushing further includes at least one guide mechanism, which guides the cover relative to the hollow body and which comprises at least one locking element, by which the cover can be locked at least in the closure position. Also provided is a system for charging an at least partly electrically powered vehicle with a wall bushing, as well as a method for connecting a wallbox to an at least partly electrically powered vehicle.

11 Claims, 1 Drawing Sheet

(56) References Cited

U.S. PATENT DOCUMENTS

| | | | | |
|---|---|---|---|---|
| 6,843,669 B2* | 1/2005 | Drane | ................. | H01R 13/506 |
| | | | | 174/480 |
| 7,227,080 B2* | 6/2007 | Kregle | ................. | H02G 3/123 |
| | | | | 174/53 |
| 7,476,803 B2* | 1/2009 | Dinh | .................... | H02G 3/185 |
| | | | | 174/53 |
| 7,788,766 B2* | 9/2010 | Mockett | ................. | H02G 3/22 |
| | | | | 174/152 G |
| 7,939,767 B2* | 5/2011 | Tiefenthaler | ............ | H02G 3/22 |
| | | | | 174/480 |
| 7,968,806 B2* | 6/2011 | Shelton | ................... | H05K 5/15 |
| | | | | 174/67 |
| 8,324,022 B2* | 12/2012 | Ramm | ................ | H01L 23/481 |
| | | | | 257/770 |
| 8,445,780 B1* | 5/2013 | Robins | .................. | H02G 3/14 |
| | | | | 174/67 |
| 8,963,023 B2* | 2/2015 | Phillips | ................. | H02G 3/123 |
| | | | | 174/486 |
| 9,950,634 B2* | 4/2018 | Bianco | ............... | B65H 75/4484 |
| 11,721,961 B2* | 8/2023 | Leese | .................... | H02G 3/123 |
| | | | | 174/502 |

FOREIGN PATENT DOCUMENTS

| | | |
|---|---|---|
| DE | 102012022100 A1 | 5/2013 |
| DE | 202014101216 U1 | 5/2015 |
| EP | 3135528 A1 | 3/2017 |
| JP | 2013031270 A | 2/2013 |

* cited by examiner

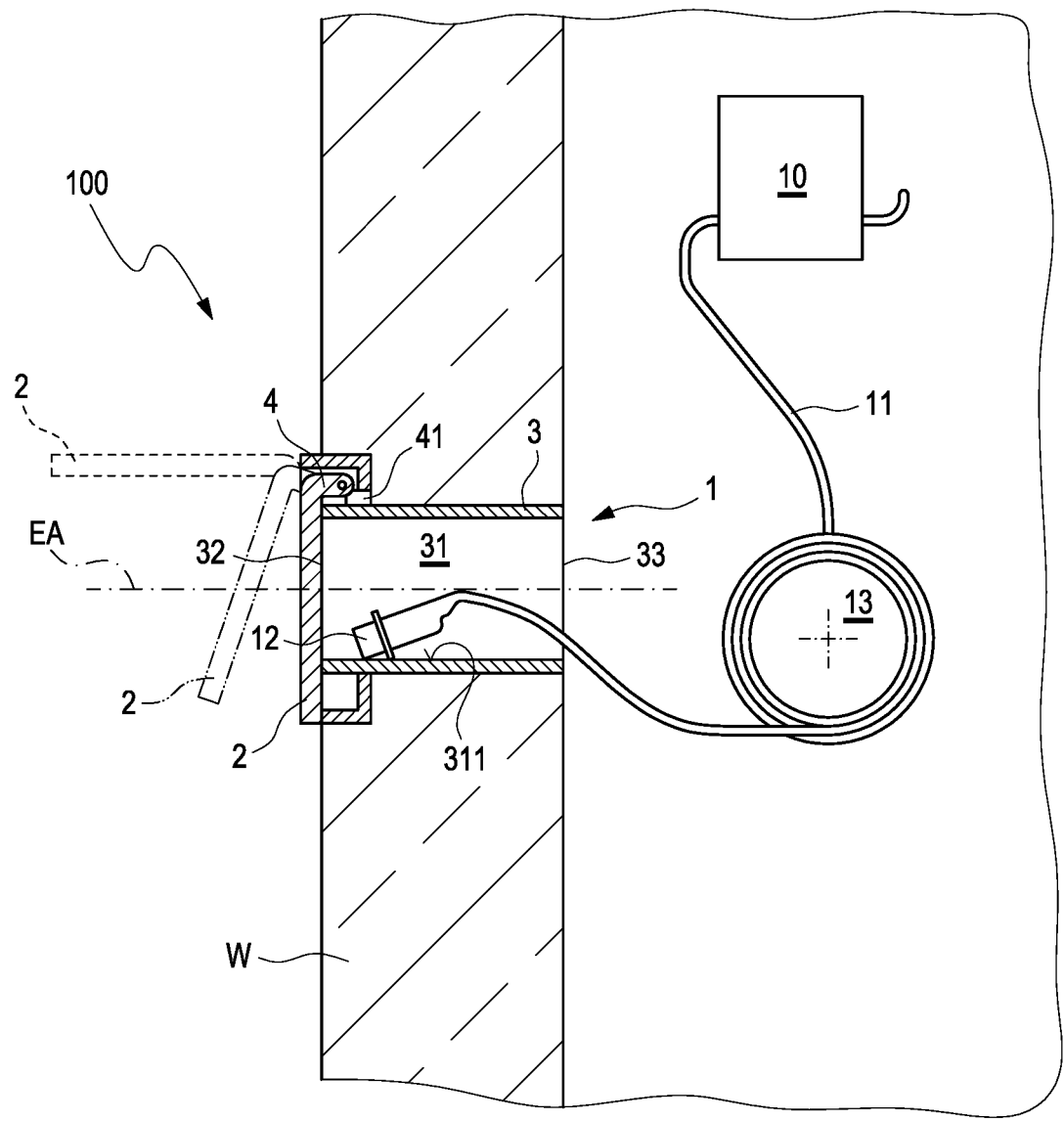

WALL BUSHING

BACKGROUND

Technical Field

The present disclosure relates to a wall bushing for leading an electrical cable through a wall, and to a system for charging an at least partly electrically powered vehicle with a wall bushing as well as a method for connecting a wallbox to an at least partly electrically powered vehicle.

Description of the Related Art

Electrically powered vehicles or hybrid vehicles can be connected for the charging of the drive battery to a wallbox or a power outlet, which furnishes the electrical energy needed for the charging. The wallbox or the power outlet is often located inside a building, and the vehicle being charged is often located outside the building, for example, in an entry way. The placement of a wallbox or power outlet on an outer wall of a building is objectionable, since such a placement is often visually unpleasant to the building. Furthermore, with a placement outside a building the technical elements are exposed to weather factors and can easily be reached and tampered with by unauthorized persons. A placement inside a building improves the safety and functional fitness. The problem with the placement of a wallbox or power outlet in a building and the parking of a vehicle outside the building is that a charging cable for the charging of the vehicle must be led from inside the building to the outside. A passing through existing openings in the building, such as doors or windows, is costly and prone to defects.

The document CN112060948A describes charging equipment for charging an electric vehicle, comprising a charging cable having a charging connector, as well as the necessary electronics for the charging. All the elements of the charging equipment are arranged in a cabinet-like housing, having a flap at the bottom for leading through the charging cable.

In the document DE202004011259U1 there is described a cable bushing through a building wall with improved fire protection. This cable bushing comprises a tubular element, which passes through a building wall. One or more cables are led through the tubular element, while an insulation pack surrounds the cable in order to assure thermal insulation of the building interior against the building outside.

The document JP2013031270A describes various ways of wiring a system for charging an electric vehicle. The system makes it possible to charge an electric vehicle located outside a building by an energy source which is located inside the building. For this, a solution is described which involves a permanent wall bushing through a building wall, wherein a charging cable is led through a borehole in the wall and protected by a water-tight box on the outside of the building.

Embodiments of the invention propose solutions with which a current source located inside a building can be connected more easily to an electric vehicle located outside a building.

An embodiment includes a wall bushing for leading an electrical cable through a wall, the wall bushing comprising: a hollow body which extends at least for a portion along an axis of extension and encloses the axis of extension at least partially in the circumferential direction, the hollow body having a cavity in its interior and having an opening at each of two ends opposite each other in the direction of the axis of extension, forming an access to the cavity, at least one cover which in a closure position of the wall bushing closes one of the openings at least partially and in a pass-through position frees up this opening at least partly, at least one guide mechanism, which guides the cover relative to the hollow body and which comprises at least one locking element, by which the cover can be locked at least in the closure position, wherein the cover can be moved reversibly from the closure position to the pass-through position and vice versa and in the interior of the cavity there is arranged a receiving element, which is provided as a seat for a plug connector of an electrical cable in the closure position.

A wall bushing as described herein makes it possible to lead a cable or a similar object in a simple manner through a wall of a building. The wall bushing comprises a hollow body, which extends along an axis of extension. In some embodiments, the axis of extension is linear and in the installed state of the wall bushing may be oriented perpendicular to the wall. The hollow body can be configured as a tube, for example, which extends along a straight axis of extension and completely encloses this axis of extension in the circumferential direction. Such a tube can be installed easily in a building wall. One need only make a corresponding hole in the building wall, which can be done for example by boring, chiseling, or cutting. After this, the hollow body is placed in the resulting opening. However, it is also possible for the hollow body to extend about the circumferential axis for only a portion of the circumference and to provide, for example, a slit running in the direction of the axis of extension, which interrupts the hollow body in the circumferential direction and which makes it easier to install and mount the hollow body in the wall, since the hollow body will have a slightly deformable outer geometry.

The cross section of the hollow body in a top view looking at the axis of extension may have various configurations. A circular round cross section or a polygonal cross section of the hollow body have proven to be advantageous. Inside the hollow body there is a cavity, through which an electric cable can be led. This cavity has an opening at each of the mutually opposite ends in the direction of the axis of extension, making possible access to the cavity in the hollow body. An electric cable is introduced through one opening into the cavity and led out once more through the other opening from the cavity.

The wall bushing according to an embodiment described herein has a cover, which in a closure position closes one of the openings, such as an opening situated in the installed state on the outside of the building. In some instances, the cover in the closure position completely closes the opening, so that a good seal of the wall bushing is assured in the closure position. However, it is also possible for the cover to have a small opening, such as a slit, making possible access to the cavity also in the closure position. Such a small opening can be used, for example, as a cable bushing in the closure position. The cover can alternatively take up a pass-through position, in which the cover is positioned such that it frees up the opening to the cavity at least for a portion.

The pass-through position is a state of the wall bushing in which an electric cable can be easily and conveniently led from the inside of the building to the outside of the building. In the pass-through position, there is present a larger opening to the cavity, which also allows the leading through of a charging connector, having larger dimensions than the charging cable itself. The wall bushing may further include a guide mechanism, which guides the cover relative to the hollow body, in particular it may guide movement of the cover from the closure position to the pass-through position and vice versa. The guide mechanism can have various configurations, for example, it may be configured as one or more joints or alternatively, as one or more linear guides.

The guide mechanism may further comprise a locking element, which makes possible a locking of the cover at least in the closure position. The locking element can be designed, for example, as a simple mechanical bolt, which engages with a complementary shaped bolt seat in the hollow body. The locking element makes it possible to secure the wall bushing in the closure position against unauthorized opening. This ensures that an opening of the wall bushing is only possible by authorized persons. In some embodiments, it is also possible for the locking element to bolt and secure the cover in other positions, such as an optional use position.

In some embodiments, the cover may be moved reversibly from the closure position to the pass-through position and vice versa. Reversible means here that this movement is possible without damaging or significant wear on the wall bushing. The wall bushing is configured such that many cycles of movement between the positions are possible. Inside the cavity, which in the installed state in a building wall is located inside the building wall, there is provided a receiving element. This receiving element is designed to receive a plug connector of an electric cable in the closure position. In the closure position, in which the cover is closed, this receiving element serves for safekeeping of the plug connector inside the building wall. If the electric cable is to be connected to a vehicle, it is only necessary to move the cover from the closure position to the pass-through position. Thanks to the receiving element, the plug connector can be easily reached through the opened cover from outside the building. In this way, a fast and easy connecting of the electric cable to a vehicle is possible.

The wall bushing described herein simplifies the connection of an electricity source inside a building to an electrically powered vehicle being charged that is located outside the building. Thanks to the installing of a wall bushing in the building wall, the leading through of the cable is easier and simpler. In a condition when no vehicle is to be charged, the cover of the wall bushing closes the building wall, so that weather elements, dirt and grime, and animals cannot get into the building interior. If a vehicle is to be charged, the cover can be easily moved into the pass-through position. The electrical plug connector arranged on the receiving element is conveniently reached from the outside, so that the cable can be easily grabbed, led to the vehicle, and inserted there for the charging.

During the charging of the vehicle, which often takes a long time, the cover can then be moved back into the closure position or into an optional use position, in order to close once more the opening in the cavity for the most part during the charging. In this way, even during the charging of the vehicle, the building interior is isolated from the building exterior by the cover. It is advantageous that the wall bushing can be universally used, that is, the wall bushing can be used in combination with the most diverse of electricity sources, charging cables, and electric vehicles. Furthermore, the wall bushing can also be used for other electrical apparatus, such as to lead through an electrical cable to power an electrical lawn mower. The surface of the cover facing the outside can be easily adapted to different products and also be given different optical designs according to need and taste.

The installation of the wall bushing described herein is also possible in the case of an already existing building, since one only needs to make an opening in the building wall. It has been determined that an opening with a clear width of around 20 cm is favorable for the installation of a wall bushing. In this case, the hollow body has an outer diameter of likewise around 20 cm. Furthermore, the locking element of the wall bushing is protecting the wall bushing against unauthorized opening of the cover. The locking element can be activated by various mechanisms and be easily combined, for example, with an already existing security system of the vehicle or the building.

In one embodiment, it is provided that the hollow body extends along a straight axis of extension and completely encloses it in the circumferential direction, wherein the cavity passes completely through the hollow body in the direction of the axis of extension and the openings are situated respectively at an end face of the hollow body, such as wherein the openings are oriented perpendicular to the axis of extension. In this embodiment, the hollow body has a straight tube configuration. Such a straight configuration is easy to introduce into the wall of a building. Alternatively, it is possible for the hollow body to extend along an at least partially curved axis of extension. In this way, it is possible for water getting into the wall bushing to be led downward by gravity thanks to the curvature and to drain itself.

In another embodiment, it is provided that at least one of the openings has the same diameter as the cavity substantially in a direction perpendicular to the axis of extension. In this embodiment, at least one of the openings is the same size as the cross section of the cavity in the hollow body. In this way, the cavity can be conveniently reached. In some embodiments, both openings have a diameter corresponding to the inner diameter of the cavity.

In one embodiment, it is provided that the guide mechanism is designed as a hinge, and the guide mechanism supports the cover relative to the hollow body about an axis of rotation which is oriented perpendicular to the axis of extension, wherein the cover in the closure position lies against the hollow body adjacent to one of the openings and in the pass-through position it is at a distance from the hollow body at least for a portion, wherein the cover can turn about the axis of rotation to move from the closure position to the pass-through position and vice versa. In this embodiment, the guide mechanism supports the cover rotatably about an axis of rotation. The cover forms a flap, which in the closure position lies adjacent and flush against one of the openings on the hollow body and thus effectively seals off the wall bushing against environmental factors outside a building wall. When moving the cover into the pass-through position, it is flipped to the outside about the axis of rotation of the guide mechanism. In this embodiment, the guide mechanism has a simple and robust configuration.

In some embodiments, a use position of the cover is provided, wherein the cover in the use position is situated in the direction of turning about the axis of rotation between the closure position and the pass-through position and the distance from the cover to the hollow body in the use position is less than in the pass-through position or the cover has a recess which in the closure position provides access to the opening, this recess having a surface which is smaller than the opening by at least a factor of 10. A further position of the cover can be provided, which it takes up in a condition when an electrical cable has been led through the wall bushing and the opening is to be at least partly closed and thus protected against tampering or objects getting into it. One possibility for such a protection is to provide a use position, in which the cover finds itself in a position between the closure position and the pass-through position.

Alternatively to providing the use position, a recess can be made in the cover, allowing an electrical cable to be led through the wall bushing also in the closure position. Such a recess is significantly smaller in configuration than the opening in the hollow body, in order to ensure the best possible closing of the opening by the cover in the closure position.

In an alternative embodiment, it is provided that the guide mechanism comprises a linear guide, which guides the cover movably in a direction perpendicular to the axis of extension, the cover being situated in the closure position in front of one of the openings in the direction of the axis of extension and in the pass-through position being offset from this opening in a direction perpendicular to the axis of extension, and the cover can move in a direction perpendicular to the axis of extension in order to be moved from the closure position to the pass-through position and vice versa. In this alternative embodiment, the guide mechanism allows a linear movement of the cover relative to the hollow body. In this way, the cover can be moved away from the hollow body in a direction perpendicular to the axis of extension and thus it frees up an opening entirely or partly in the pass-through position. The advantage of this embodiment is that the cover even in the pass-through position does not project outward beyond the wall or the building wall and thus is less vulnerable to damage. A use position can also be provided in this embodiment, in which the cover frees up a smaller region of the opening than in the pass-through position.

In a further embodiment it is provided that the locking element of the guide mechanism locks the cover in the closure position and/or the use position, wherein the locking element comprises a lock, which secures the locking element against unauthorized manipulation, and the lock can be activated by a mechanical key, an electronic key, or a sensor. The locking element locks or blocks the cover at least in the closure position, optionally also in the use position. This locking can be form-fitting or force-fitting. The lock of the locking element in turn protects the locking element against unauthorized activation or tampering. The lock can be opened and closed, and thus activated, with a key. The lock and the key can be configured in various ways. In one embodiment, the lock may be formed by a mechanical bolt lock, which can be activated by a mechanical key. Alternatively, the lock can be electronic or mechanical in design and be activated by an electronic key. Such an electronic key can be integrated in the vehicle key, for example, or a key for access to the building. In some embodiments, such an electronic key allows the lock to be operated from a certain distance, for example, via radio or infrared. Finally, it is also possible for the key of the lock to be formed by a sensor, such as a fingerprint sensor, which is activated to operate the wall bushing by an authenticated user through his fingerprint.

In one embodiment it is provided that the receiving element is formed by a surface of the hollow body facing in the direction of the cavity and/or a closure element is provided, which closes for a portion the opening of the hollow body located opposite the cover, this closure element being designed to be reversibly connectible to the hollow body and separable from it. In one embodiment, the receiving element is formed by an inward facing surface of the hollow body and it serves simply as a place to put a plug connector. Alternatively, a receiving element working by form-fitting can be provided, which can be configured, for example, as a hook or as a negative shape of the plug connector. In another embodiment, a closure element may also be provided for the second opening of the hollow body, which seals off the hollow body on the side facing toward the building interior. This closure element is provided with a recess, allowing an electrical cable to pass through. The closure element makes possible a better sealing of the wall bushing on two sides in the closure position. This embodiment is advantageous during cold weather or other extreme weather conditions.

Some embodiments include a system for charging an at least partly electrically powered vehicle, comprising: a wallbox furnishing electrical energy for the charging of the vehicle, at least one charging cable, which is electrically connected at one of its ends to the wallbox and has a charging connector at its end located opposite the wallbox, a wall bushing as described herein which is introduced in a wall and passes through it, and wherein the cover of the charging connector in the closure position inside the cavity is arranged on or at the receiving element and in the pass-through position and/or the use position of the cover the charging cable is led through both openings.

In some embodiments, the system comprises a wall bushing according to one of the previously described embodiments of the wall bushings described herein. The system may further comprise at least one wallbox or other power outlet, on which is arranged a charging cable having a charging connector. Thanks to the easy to install wall bushing, the system may be adapted to various places of installation, such as installation in different buildings. The system may be freely configured from a wall bushing and variously designed wallboxes and charging cables. It is possible for the end customer to assemble the system or for the system to be offered from a single source, such as a car maker. The system described herein simplifies the connection of a power source located inside a building to an electric vehicle located outside a building.

In one embodiment of the system it is provided that a cable storage is provided, which in the closure position of the cover stores a partial section of the charging cable and upon moving from the closure position to the pass-through position and/or the use position it frees up a partial section of the charging cable and upon movement from the pass-through position and/or the use position to the closure position it retracts a partial section of the charging cable, such as driven by a spring element. In this embodiment, the system additionally comprises a cable storage, which takes up a portion of the charging cable in the closure position and provides for stowing it inside the building. If the charging cable is needed, it can be easily removed from the cable storage by pulling on the charging cable. If the charging cable is no longer needed, the cable storage provides a force which moves the charging cable back to the cable storage once again. The cable storage may be configured, for example, as a cable drum or as a linear-acting cable storage, in which a partial section of the charging cable is stretched along a wall in the interior of the building.

Other embodiments include a method for connecting a wallbox to an at least partly electrically powered vehicle making use of a system described herein, wherein the wall bushing is in the closure position at the start of the method, involving the steps: A) activating of the locking element and moving of the cover from the closure position to the pass-through position; B) pulling the charging cable through both openings of the hollow body and connecting the charging connector to the vehicle; and C) moving the cover to the use position or the closure position and activating the locking element.

The method described herein serves for the simple connection of a power source located in the building interior to a vehicle located outside the building and needing to be charged. To carry out the method, a system in one of the previously described embodiments is used. The method may be carried out in the sequence of steps A) to C). In the reverse sequence of steps C) to A) the method can be used to remove the connection of a vehicle located outside the building to a power source located inside the building.

In a first step A) of the method, the locking element is activated, after which the cover is moved from the closure position to the pass-through position.

In the second step B) of the method, the charging cable is now led through both openings of the hollow body and the charging connector is connected to the vehicle being charged. Already at this time the vehicle is being charged by a power source inside the building.

In a third step C) of the method, the cover is moved to the use position or the closure position in order to reduce the protruding accessible size of the opening. Once again, the locking element is activated in order to secure the cover in the use position or the closure position, while the vehicle is being charged by the charging cable.

The method described herein makes it faster and easier to connect a vehicle parked outside a building to a power source located inside the building. At the same time, during the charging of the vehicle, access from the outside to the interior of the building is protected against environmental influences and unwanted tampering.

Features, effects and benefits which are disclosed in connection with the wall bushing and the system also count as being disclosed in connection with the method. The same holds conversely for features, effects and benefits which are disclosed in connection with the method, which also count as being disclosed in connection with the wall bushing and the system.

BRIEF DESCRIPTION OF THE SEVERAL VIEWS OF THE DRAWINGS

Embodiments are represented schematically with the aid of the drawing and shall be further described with reference to the drawing.

FIG. 1 shows in a schematic view, one embodiment of a system described herein.

DETAILED DESCRIPTION

FIG. 1 shows in a schematic view one embodiment of a system 100. In the schematic view, the system 100 is represented in principle. The actual dimensions of the individual components, such as the cable storage 13, are not shown true to scale. The wall W belongs to a building, such as a garage. At the right side of the wall W is situated the building interior, in which a wallbox 10 and a cable storage 13 are situated. A charging cable 11 runs from the wallbox 10 across the cable storage 13 to the wall W and ends there with a charging connector 12, which is electrically connected to it for the charging of an electric vehicle. In the wall W there is arranged an embodiment of a wall bushing 1, the wall bushing 1 passing completely through the wall W.

The hollow body 3 is situated inside the wall W and extends along a horizontally running axis of extension EA. Inside the hollow body 3 there is arranged a cavity 31, which likewise extends along the axis of extension EA. In the embodiment shown, the hollow body 3 and also the cavity 31 have a closed round circular cross section in a top view from the direction of the axis of extension EA. Thus, in this embodiment, the hollow body 3 is formed by a circular round tube. The hollow body 3 can be sealed off against the wall W, for example by construction foam or silicone. The receiving element 311 in the embodiment shown is formed by a surface of the hollow body 3 facing in the direction of the cavity 31. The receiving element 311 here is configured as a simple stowing surface, on which the charging connector 12 is stowed. Alternatively, the receiving element 311 can also be formed, for example, as a hook or the like, from which the charging connector 12 can be suspended. The hollow body 3 or the cavity 31 has two openings 32, 33, which are situated at opposite ends of the hollow body 3 in the direction of the axis of extension EA. The opening 32 allows access to the cavity 31 from outside the building, and the opening 33 allows access to the cavity 31 from inside the building. The two openings 32, 33 in the embodiment shown have the same diameter as the cavity 31. The two openings 32, 33 are situated perpendicular to the axis of extension EA. Alternatively, it would also be possible for one or both of the openings 32, 33 to be smaller than the inner cross section surface of the cavity 31. However, the openings 32, 33 always have a cross section surface through which a charging connector 12 can be introduced into the cavity 31 and removed from it. The cover 2 is shown by solid lines in the closure position and in this position it closes entirely the outward facing opening 32. The guide mechanism 4 in the embodiment shown is designed as a hinge or joint and situated above the cavity 31, next to the opening 32. The guide mechanism 4 guides the cover relative to the hollow body 3. The guide mechanism 4 in the form of a hinge has an axis of rotation running into the plane of the drawing and thus being oriented perpendicular to the axis of extension EA. The cover 2 can turn about this axis of rotation and can be moved in this way into the pass-through position. The cover 2 in the pass-through position is shown by dashed lines in FIG. 1. The pass-through position is the position in which the cover 2 is oriented basically parallel to the axis of extension EA. The cover 2 in this pass-through position is completely away from the hollow body 3 and frees up the entire opening 32. In this pass-through position, one can conveniently reach into the cavity 31 from outside the wall W and reach the charging connector 12 there. In the embodiment shown, the cover 2 can occupy a further position, namely, the use position. The cover 2 in the use position is indicated by dot and dash lines and is located between the cover 2 in the pass-through position shown by dashed lines and the closure position shown by solid lines. The distance between the cover 2 and the hollow body 3 in the use position is less than that in the pass-through position. In a condition in which the charging cable 11 has been led through the wall bushing 1 and connected to a vehicle, the use position of the cover 2 is established. This use position allows the charging cable 11 to pass through the spacing between the cover 2 and the edge of the opening 32. However, this spacing is so small that the cavity 31 is well protected against tampering or dirt and grime getting in. In some embodiments, the locking element 41 also allows a locking in the use position to prevent a changing of the position of the cover 2 by unauthorized persons. The locking element 41 is situated symbolically adjacent to the guide mechanism 4 designed as a hinge. In the embodiment shown, the locking element 41 acts by producing a form-fitting connection to the cover in the use position and in the closure position. Such a form-fitting connection can be produced, for example, by having a bolt fashioned as a pin engage with complementary shaped openings in the axis of rotation of the hinge. Alternatively, the locking element 41 can also be arranged in another place, for example, on the side of the hollow body 3 and the cover 2 situated opposite the guide mechanism 4 in the vertical direction, relative to the axis of extension EA. In order to make possible a partial closure of the opening 32 with the charging cable 11 led through, a recess can be made in the cover, alternatively to providing a use position, through which the charging cable 11 can be led in the closure position. Such a recess may be designed as a slit which is slightly larger than the diameter of the charging cable 11, yet smaller than the outer dimensions of the charging connector 12. In this alternative embodiment, only two positions need to be provided for the cover 2, which simplifies the construction of the guide mechanism 4 and the locking element 41. For protection against unwanted tempering, the locking element 41 preferably has a lock, which can only be opened and closed with a special key.

The wallbox 10 can have various configurations and it provides the energy needed for the charging of the vehicle. For this, the wallbox 10 has an entrance located at its right side. At the left side, the charging cable 11 is led out from the wallbox 10, at first going to the cable storage 13. The cable storage 13 in the embodiment shown is designed as a cable drum, on which a partial portion of the charging cable 11 is wound up. In the closure position shown, a larger portion of the charging cable 11 is stowed in the cable storage 13. In the pass-through position, the charging cable 11 is pulled through the wall bushing 1, whereupon the cable storage 13 frees up a partial portion of the charging cable 11 in orderly manner. The cable storage 13 designed as a cable drum has a spring element, which exerts a slight opposing force on the charging cable 11 when the charging cable 11 is pulled out. In this way, only as much charging cable 11 is unwound as is needed. After the end of the charging of the vehicle, the cable storage 13 pulls the charging cable 11 through the wall bushing 1, the force needed for this being provided by the spring element. In some embodiments, the cable storage 13 has a no-return device, preventing an unwanted retraction of the charging cable 11 in the use position or the closure position. Such a no-return device can be activated or deactivated, for example, by a short pull on the charging cable 11. The cable storage 13 improves the guiding of the charging cable 11 and assures a neat arrangement inside the building. The cable storage 13 may also optionally be left out. If no cable storage 13 is provided, then the charging cable 11 runs directly from the wallbox 10 to the wall bushing 1.

German patent application no. 10 2022 117956.7, filed Jul. 19, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A wall bushing for leading an electrical cable having a plug connector through a wall, comprising:
   a hollow body which extends at least for a portion along an axis of extension and encloses the axis of extension at least partially in the circumferential direction, the hollow body having a cavity in an interior thereof and having a respective opening at each of two ends opposite each other in the direction of the axis of extension, forming access to the cavity from each of the two ends, the openings being sized and configured to enable the plug connector of the electrical cable to enter the hollow body from one of the two ends at an interior side of the wall and exit the hollow body from the other one of the two ends at an exterior side of the wall during a charging operation with the electrical cable extending through the hollow body;
   at least one cover which in a closure position of the wall bushing closes the opening on the exterior side of the wall at least partially and in a pass-through position frees up the opening at least partly; and
   at least one guide mechanism, which guides the cover relative to the hollow body and which comprises at least one locking element, by which the cover can be locked at least in the closure position,
   wherein the cover can be moved reversibly from the closure position to the pass-through position and vice versa, and
   wherein in the interior of the cavity there is arranged a receiving element, which is provided as a seat for the plug connector of the electrical cable when the cover is in the closure position.

2. The wall bushing according to claim 1, wherein the hollow body extends along a straight axis of extension and completely encloses the axis of extension in the circumferential direction, wherein the cavity passes completely through the hollow body in the direction of the axis of extension and the openings are situated respectively at an end face of the hollow body.

3. The wall bushing according to claim 2, wherein the openings are oriented perpendicular to the axis of extension.

4. The wall bushing according to claim 1, wherein at least one of the openings has a same diameter as the cavity substantially in a direction perpendicular to the axis of extension.

5. The wall bushing according to claim 1, wherein the guide mechanism is designed as a hinge, and the guide mechanism supports the cover relative to the hollow body about an axis of rotation which is oriented perpendicular to the axis of extension, wherein the cover in the closure position lies against the hollow body adjacent to one of the openings and in the pass-through position the cover is at a distance from the hollow body at least for a portion, wherein the cover can turn about the axis of rotation to move from the closure position to the pass-through position and vice versa.

6. The wall bushing according to claim 5, wherein a use position of the cover is provided, wherein the cover in the use position is situated in the direction of turning about the axis of rotation between the closure position and the pass-through position and the distance from the cover to the hollow body in the use position is less than in the pass-through position.

7. The wall bushing according to claim 1, wherein the locking element of the guide mechanism locks the cover in the closure position and/or the use position, wherein the locking element comprises a lock, which secures the locking element against unauthorized manipulation, and the lock can be activated by a mechanical key, an electronic key, or a sensor.

8. The wall bushing according to claim 1, wherein the receiving element is formed by a surface of the hollow body facing in the direction of the cavity and a closure element is provided, which closes for a portion the opening of the hollow body located opposite the cover, the closure element being designed to be reversibly connectible to the hollow body and separable from the hollow body.

9. A system for charging an at least partly electrically powered vehicle, comprising:
   a wallbox, furnishing electrical energy for the charging of the vehicle;

at least one charging cable, which is electrically connected at an end of the at least one charging cable to the wallbox and has a charging connector at an end located opposite the wallbox; and a wall bushing which is introduced in a wall and passes through the wall, the wall bushing including: a hollow body which extends at least for a portion along an axis of extension and encloses the axis of extension at least partially in the circumferential direction, the hollow body having a cavity in an interior thereof and having a respective opening at each of two ends opposite each other in the direction of the axis of extension, forming access to the cavity from each of the two ends, the openings being sized and configured to enable the charging connector of the charging cable to enter the hollow body from one of the two ends at an interior side of the wall and exit the hollow body from the other one of the two ends at an exterior side of the wall during a charging operation with the charging cable extending through the hollow body; at least one cover which in a closure position of the wall bushing closes the opening on the exterior side of the wall at least partially and in a pass-through position frees up the opening at least partly; and at least one guide mechanism, which guides the cover relative to the hollow body and which comprises at least one locking element, by which the cover can be locked at least in the closure position, wherein the cover can be moved reversibly from the closure position to the pass-through position and vice versa, and wherein in the interior of the cavity there is arranged a receiving element, which is provided as a seat for the charging connector when the cover is in the closure position, and wherein, in the closure position of the cover, the charging connector is arranged on or at the receiving element and, in the pass-through position of the cover, the charging cable is led through both openings of the hollow body of the wall bushing.

10. The system according to claim 9, wherein a cable storage is provided, which in the closure position of the cover stores a partial section of the charging cable and upon moving from the closure position to the pass-through position the cable storage frees up a partial section of the charging cable and upon movement from the pass-through position to the closure position the cable storage retracts a partial section of the charging cable.

11. A method for connecting a wallbox to an at least partly electrically powered vehicle using a system having a wall bushing for leading an electrical charging cable having a charging connector through a wall, the wall bushing including: a hollow body which extends at least for a portion along an axis of extension and encloses the axis of extension at least partially in the circumferential direction, the hollow body having a cavity in an interior thereof and having a respective opening at each of two ends opposite each other in the direction of the axis of extension, forming access to the cavity from each of the two ends, the openings being sized and configured to enable the charging connector of the electrical charging cable to enter the hollow body from one of the two ends at an interior side of the wall and exit the hollow body from the other one of the two ends at an exterior side of the wall during a charging operation with the electrical charging cable extending through the hollow body; at least one cover which in a closure position of the wall bushing closes the opening on the exterior side of the wall at least partially and in a pass-through position frees up the opening at least partly; and at least one guide mechanism, which guides the cover relative to the hollow body and which comprises at least one locking element, by which the cover can be locked at least in the closure position, wherein the cover can be moved reversibly from the closure position to the pass-through position and vice versa, wherein in the interior of the cavity there is arranged a receiving element, which is provided as a seat for the charging connector of the electrical charging cable when the cover is in the closure position, and wherein the wall bushing is in the closure position at the start of the method, the method comprising:

activating the locking element and moving the cover from the closure position to the pass-through position;

pulling the electrical charging cable through both openings of the hollow body of the wall bushing and connecting the charging connector to the at least partly electrically powered vehicle; and moving the cover to a use position or the closure position and activating the locking element.

\* \* \* \* \*